Feb. 3, 1959     J. H. HALPERT     2,871,594
SERVICE CONTROL DEVICES

Filed Dec. 5, 1955     2 Sheets-Sheet 1

INVENTOR.
JOSEPH H. HALPERT

BY Charles L. Lovercheck
attorney

Feb. 3, 1959 J. H. HALPERT 2,871,594
SERVICE CONTROL DEVICES
Filed Dec. 5, 1955 2 Sheets-Sheet 2
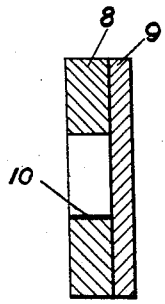
Fig. 3
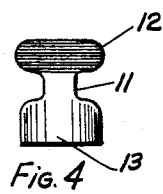
INVENTOR.
JOSEPH H. HALPERT
BY
Charles L. Lovenhuk
attorney United States Patent Office 2,871,594
Patented Feb. 3, 1959

2,871,594

SERVICE CONTROL DEVICES

Joseph H. Halpert, Erie, Pa.

Application December 5, 1955, Serial No. 551,081

2 Claims. (Cl. 40—63)

This invention relates to work scheduling devices and more particularly to devices for scheduling work in an automobile repair establishment.

This invention constitutes a continuation in part of application, Serial No. 391,105, filed November 9, 1953, which has been abandoned.

In scheduling the work to various mechanics in a large automobile establishment, there exists the problem of keeping each mechanic busy as constantly as possible during the hours of the day without interfering with his work and, at the same time, without overloading other mechanics. At present, the scheduling of work often results in one mechanic being assigned more work than he can complete while other mechanics have time to spare and, at the same time, the write up man turns work away.

The invention is carried out by means of a board having a plurality of aligned spaced holes formed therein and preferably has an iron sheet attached to the back of the board and one or more magnetic indicator members adapted to be inserted in the openings. The openings are numbered to correspond to the hours of a working day and the indicia member is moved along the board by the dispatcher or time salesman in the establishment. Each row or each double row of the openings are preceded on the board by the name of the mechanic whose daily record would be indicated by the position of the indicia member on the board. For example, if Jones is employed to wash automobiles and operates over an eight hour day, each opening in the board would represent an hour, half an hour, or some other unit of time. If one-half hour is required to wash a car and two wash jobs come in for Jones, the time salesman will move the indicia member along the board to the second opening, indicating that Jones has been scheduled for two wash jobs. Then if another time salesman takes in three more wash jobs for Jones, he moves the indicia member three more openings and will be apprized that Jones has two and one-half hours of his time scheduled. This process continues for each mechanic in the establishment and when the time of any one mechanic or serviceman has been sold, all the time dispatchers will be apprized thereof and will also be able to tell if there is any time left for any one serviceman.

A red flag could be attached to alternate indicia members to be used to indicate the estimated time of jobs assigned to any particular mechanic when the actual time is not certain. Blue flags, for example, could be used on an indicia member to indicate actual time sold. A green flag could be placed on the indicia member to indicate when any mechanic has taken the day off.

The above described device can be used to sell the time for each mechanic or serviceman by the hour and this can also be used to aid in selling the time of various departments. When the device is used to sell the time of departments, the manager of the organization will be apprized immediately of the comparative efficiency of various departments in selling time of their mechanics. He will, therefore, know which department manager should be instructed for more efficient methods.

More specifically, it is an object of this invention to provide a means for scheduling work in a service establishment which is simple in construction, economical to construct, and efficient and simple to use.

Another object of the invention is to provide a work scheduling device and arrangement wherein the work is allotted to various mechanics in various portions of an establishment by means of an indexing board which can be observed to determine the schedule of work and the time that work in process can be finished.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

Fig. 3 is an enlarged view of an indexing board according to the invention;

Fig. 4 is an enlarged view of one of the indicators for use on the board shown in Fig. 3;

Fig. 5 is an enlarged cross sectional view of one of the openings in the board shown in Fig. 3.

Figure 1:
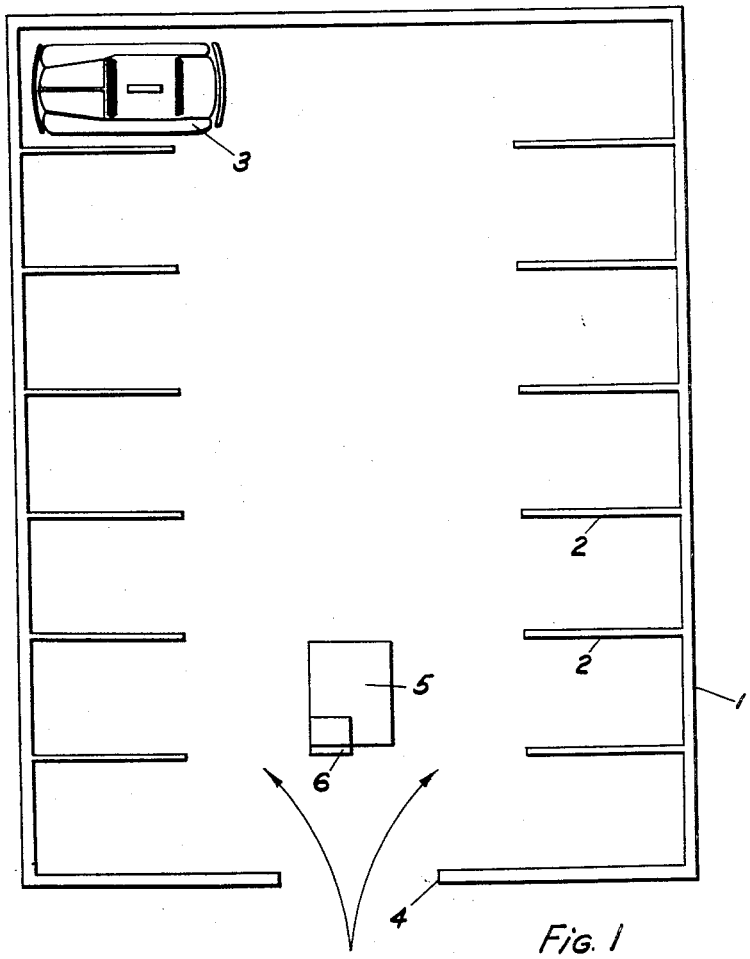
Fig. 1 is a plan view of a service establishment according to the invention.
Figure 2:
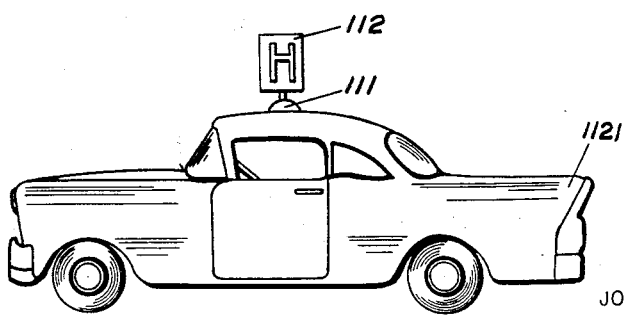
Fig. 2 is a side view of an automobile showing an indexing indicia member disposed on the top thereof.

Now with more specific reference to the drawings, Fig. 1 shows a layout of an automobile repair establishment at 1 having a plurality of partitions 2 therein which may be marked on the floor of the establishment 1 to indicate to the repair men or mechanics the extent of their repair areas. An automobile 3 is shown in the end establishment; however, various automobiles could be disposed in various parts of the repair areas. Adjacent the entrance of the establishment 1, the reception area 5 is disposed where the write up man or receptionist meets the various customers and interviews them regarding the extent and nature of difficulties they have had with their automobiles.

An indicia support or board 6 shown in Figs. 3 and 5 may be attached to a convenient place at the reception area 5. The support 6 is shown partially in cross section in Fig. 5 and is made up of non-magnetic material 8 with a backing member 9 preferably made of magnetic material such as iron or the like. The board 6 has a plurality of spaced openings 10 which are adapted to receive indicia members 11 which may have handles 12 thereon and bases 13 containing a permanent magnet. The openings 10 are numbered to correspond to the hours of a working day in each row and the indicia member 11 is moved along the board 6 from one opening 10 to another by the dispatcher or time salesman in the establishment as work is assigned to the mechanic whose name appears on the particular row. Each row is designated by the name of a particular mechanic at 14 as indicated.

Additional rows 30 and 31 are provided to indicate the time of various departments; for example, a wash department and a lubrication department. The indicia members 11 can be moved along the rows 30 and 31 to indicate to the manager of the establishment what part of the time of the department has been sold. He can therefore compare at a glance the relative efficiency of various departments.

The indicia members 11 in Fig. 4 may have a card on top like that shown at 111 on top of the automobile 1121 having a card 112 attached thereto which will have an indicia thereon indicating the particular mechanic who has been assigned to work on the automobile on which the card is fixed. For example, the letter H might indicate a man having an initital H. In addition to the member 111, a similar indicia member would be provided in each opening in the board 6 and as jobs were assigned to various mechanics, the indicia members would be taken from the board 6 and attached to the particular automobile on which the mechanic having the initial H was to work. By this means, the time salesman could tell how much of the time of each mechanic has been sold and the mechanics would know which automobiles had been assigned to each of them for work.

When the system disclosed herein is in use and a customer brings his automobile into the establishment, the write up man will take the customer's name down on the Work Progress Board in the first column and, from the customer, discover what he wishes to have done on his automobile. The write up man will then select indicia members having the proper designation in place on the card; for example, W for wash, L for lubrication, U for undercoat, T for transmission, D for differential, C for clutch, etc. The write up man will then look at the Mechanics and Departmental Time Table to see how much of each mechanic's time is occupied. From this information, he will estimate which mechanic can best take time to do the work and when it can be completed and so apprize the customer and write the time down in the Time Promised column. He will then estimate the time necessary and advance the indicia members ahead on the Mechanics and Departmental Time Table. For example, if it is a one hour job, he will not that Jones has from 11:00 to 12:00 unscheduled and he will move the indicia member up to the 12:00 position in Jones' row. This will indicate that all of Jones' time has been sold for the half day and that the work could be completed by 12:00. The write up man will then write 12:00 in the Time Promised column. He will then select an indicia member 213 having a magnetic base 214 and affix the indicia member 213 to the automobile. The letter on the indicia member 213 will designate the mechanic who is assigned the work; for example, the letter would be J on the indicia member 213 if Jones was to work on the automobile.

Figure 6:
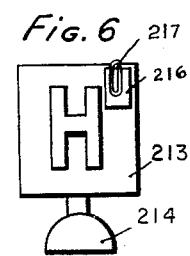
Fig. 6 is a view of an indicia member for mounting on top of an automobile as shown in Fig. 2, which may be mounted on the board shown in Fig. 3.

After the work is completed, the write up man will remove all the indicia members shown in Fig. 6 from the top of the automobile. The automobile will immediately be recognized at a glance as having no further work to be performed thereon in the establishment and it can be removed to an uncongested parking area.

With the above kit of equipment, it is possible for any person entering a service establishment where this system is in use to tell at a glance the time of the mechanics which has been scheduled, the progress of work which is accomplished on automobiles in the establishment, and the automobiles on the floor which have been completed.

The foregoing specification sets forth the invention in its preferred practical forms but the structure shown is capable of modification within a range of equivalents which is to be understood is broadly novel as is commensurate with the appended claims.

The embodiments of the invention in which an exclusive property or privilege is claimed are defined as follows:

1. An indexing board comprising a non-magnetic portion having holes therein with a magnetic back thereon, said holes being aligned in spaced rows designating the name of a particular person, and indicia members having permanent magnets thereon adapted to be disposed in said holes to indicate the number of hours of a working day which has been sold for each individual represented by said rows.

2. A device for indexing automobiles in a service establishment comprising a flat plate like member made of non-magnetic material, holes in said plate like member, said holes being disposed in spaced rows designating the name of a particular person, magnetic material on one side of said plate like member overlying said holes, and indicia members disposed in some of said holes, each of said indicia member having a permanent magnet therein adapted to be disposed in said holes and to cooperate with said magnetic material to hold said indicia members in place in said holes to indicate the number of hours of a working day which has been sold for each particular person represented by said rows.

References Cited in the file of this patent

UNITED STATES PATENTS

| | | |
|---|---|---|
| 1,576,713 | Borreson | Mar. 16, 1926 |
| 1,624,741 | Leppke | Apr. 12, 1927 |
| 2,169,498 | Molz | Aug. 15, 1939 |
| 2,455,007 | Hayslip | Nov. 30, 1948 |
| 2,511,370 | Pfeiffer | June 13, 1950 |
| 2,518,204 | Victor | Aug. 8, 1950 |
| 2,539,810 | Butler | Jan. 30, 1950 |
| 2,632,269 | Sanders | Mar. 30, 1953 |

FOREIGN PATENTS

| | | |
|---|---|---|
| 12,053 | Great Britain | June 3, 1908 |
| 26,701 | Great Britain | Nov. 20, 1912 |